US011529662B2

United States Patent
Achinger et al.

(10) Patent No.: US 11,529,662 B2
(45) Date of Patent: Dec. 20, 2022

(54) CUTTING STATION AND METHOD FOR AUTOMATICALLY CUTTING CABLE ELEMENTS TO A SPECIFIC LENGTH

(71) Applicant: LEONI Bordnetz-Systeme GmbH, Kitzingen (DE)

(72) Inventors: Markus Achinger, Augsburg (DE); Jessica Dutz, Augsburg (DE); Johann Saule, Augsburg (DE); Andreas Nedobijczuk, Augsburg (DE)

(73) Assignee: LEONI Bordnetz Systeme GmbH, Kitzingen (DE)

( * ) Notice: Subject to any disclaimer, the term of this patent is extended or adjusted under 35 U.S.C. 154(b) by 270 days.

(21) Appl. No.: 16/863,304

(22) Filed: Apr. 30, 2020

(65) Prior Publication Data
US 2020/0346263 A1 Nov. 5, 2020

(30) Foreign Application Priority Data
Apr. 30, 2019 (DE) ...................... 10 2019 206 243.1

(51) Int. Cl.
*B21C 51/00* (2006.01)
*H02G 1/00* (2006.01)
(Continued)

(52) U.S. Cl.
CPC .............. *B21C 51/00* (2013.01); *B21F 11/00* (2013.01); *B26D 7/02* (2013.01); *B41F 17/10* (2013.01); *H02G 1/005* (2013.01)

(58) Field of Classification Search
CPC ...... B21C 51/00; H02G 1/005; H02G 1/1256; B41F 17/10; B21F 11/00; B26D 7/02; (Continued)

(56) References Cited

U.S. PATENT DOCUMENTS 3,907,007 A 9/1975 Hobbs et al.
4,581,796 A * 4/1986 Fukuda ................. H01R 43/28
29/748

(Continued)

FOREIGN PATENT DOCUMENTS

DE 25 02 112 A 7/1975
DE 690 26 977 T2 10/1996
(Continued)

*Primary Examiner* — Ghassem Alie
(74) *Attorney, Agent, or Firm* — Muncy, Geissler, Olds & Lowe, P.C.

(57) ABSTRACT

A cutting station for the automatic cutting to a specific length of cable elements and has a magazine which extends in a longitudinal direction and a transverse direction and has several holders for one cable element each. The cable elements are held next to each other in a horizontal magazine plane. A processing head extends in a longitudinal direction, which is movable in a transverse direction relative to the stationary magazine and is designed for gripping, pulling off and cutting to a specific length a respective currently selected cable element from the magazine. Each holder has two fixing elements spaced apart from one another in the longitudinal direction for holding the cable element. For machining by the processing head, a respective holder with a respective cable element is lifted in a preferred configuration from the magazine plane into the working plane.

18 Claims, 2 Drawing Sheets

(51) Int. Cl.
*B26D 7/02* (2006.01)
*B21F 11/00* (2006.01)
*B41F 17/00* (2006.01)
*B41F 17/10* (2006.01)

(58) Field of Classification Search
CPC ...... H01B 13/00; H07G 1/1248; H01R 43/28; B65H 2701/36
USPC ......... 83/282, 439, 76.8, 947; 140/140, 102; 81/9.51; 29/857, 748, 755
See application file for complete search history.

(56) References Cited

U.S. PATENT DOCUMENTS

| | | | |
|---|---|---|---|
| 4,976,294 A | 12/1990 | Kudo et al. | |
| 5,052,449 A | 10/1991 | Fukuda et al. | |
| 5,208,977 A * | 5/1993 | Ricard | G02B 6/444 29/33 F |
| 5,247,732 A * | 9/1993 | Lait | H01R 43/28 29/33 M |
| 5,852,868 A * | 12/1998 | Soriano | H01R 43/048 29/33 M |
| 6,135,164 A * | 10/2000 | Celoudoux | H01R 43/28 140/102 |
| 6,662,987 B2 * | 12/2003 | Emi | H01R 43/28 226/110 |
| 6,886,438 B2 * | 5/2005 | Viviroli | H02G 1/1256 83/947 |
| 10,965,080 B2 * | 3/2021 | Viviroli | H01R 43/052 |
| 2006/0179908 A1 | 8/2006 | Braun et al. | |
| 2020/0161025 A1 | 5/2020 | Dietlein et al. | |
| 2021/0181704 A1 * | 6/2021 | Fröhlich | H01R 43/05 |

FOREIGN PATENT DOCUMENTS

| | | |
|---|---|---|
| DE | 19844416 A1 | 4/1999 |
| DE | 10 2017 206 139 A1 | 10/2018 |
| EP | 0137631 A2 | 4/1985 |
| EP | 0 999 558 A2 | 6/2000 |

* cited by examiner

CUTTING STATION AND METHOD FOR AUTOMATICALLY CUTTING CABLE ELEMENTS TO A SPECIFIC LENGTH

This application claims the priority, under 35 U.S.C. § 119, of German application DE 10 2019 206 243, filed Apr. 30, 2019, which is herewith incorporated by reference in its entirety.

BACKGROUND OF THE INVENTION

Field of the Invention

The invention relates to a cutting station and a method for automatically cutting cable elements to a specific length, in particular for automated production of a cable harness, in particular for a motor vehicle.

Description of the Background Art

A cable set generally has a large number of individual cable elements that are connected to each other. The cable elements are in particular cores. A "core" is generally understood to be a conductor surrounded by insulation, either a conductor wire or a stranded conductor.

Typically, different cable elements, in particular different cores, are used for one cable set. These cores differ, for example, in terms of their conductor (stranded conductor, solid conductor), their conductor diameter or in terms of their insulation (core sheath) and, in particular, also in terms of their length.

DE 10 2017 206 139 A1 describes a plant and a process for the automated production of a cable harness. One of the first stages of this plant is a cutting station in which the individual cable elements are cut to a specified length. The cable elements are provided on reels. By means of a transport system, the prepared, cut-off cable sections are then transported to the next processing station, for example a crimping station.

SUMMARY OF THE INVENTION

It is therefore an object of the invention to provide a suitable cutting station for automatically cutting cable elements to a specific length for such an automatic cable harness production.

In an exemplary embodiment, a cutting station is provided for automatically cutting cable elements to a specific length, the cutting station comprising for this purpose a magazine which extends in a longitudinal direction and a transverse direction and comprises a plurality of holders, each holder being provided for holding a cable element respectively. The cable elements are held by the individual holders in a magazine plane next to each other, which in particular extends horizontally. Furthermore, the cutting station comprises a processing head extending in a longitudinal direction. The processing head thus extends parallel to the individual holders, which also extend in the longitudinal direction. The processing head can be moved in transverse direction relative to the stationary magazine. In particular, the processing head can only be moved in the transverse direction relative to the magazine. A movement in longitudinal direction is preferably not provided. The respective cable element is preferably conveyed in the longitudinal direction within the processing head. The processing head is used for processing, i.e. for gripping, pulling and cutting to a specific length a cable element currently selected from the magazine. The processing head is arranged above the magazine plane. The holders are each arranged next to each other in a transverse direction and each holder extends from an unwinding-side rear end in the longitudinal direction to a front end. Each holder has two longitudinally spaced fixing elements for holding the respective cable element.

The cable elements are typically provided and unwound from reels. The cable elements are guided from the reel from the rear end of the holder to the front end. An end section of the cable element is held at the front end.

Different types of cable elements, especially cores, are provided by the magazine. During operation, the processing head successively selects the required type of cable element by moving the processing head in a transverse direction relative to the magazine, selecting the required cable element, gripping it, then unwinding it from the reel in the longitudinal direction and pulling it off until the required length is reached, and then cutting off a (front) line section of the cable element provided by the reel so that a line section which is cut to the required length is provided, which can then be further processed.

Due to the horizontal alignment of the magazine, the processing head can easily approach the selected cable element. The fixed magazine also requires no lateral relative movement between the individual holders and the reels from which the individual cable elements are unwound. The holders and the reels are therefore preferably also arranged in a fixed position.

The cutting station can be designed to lift a selected holder together with the cable element in a vertical direction (perpendicular to the longitudinal direction and perpendicular to the transverse direction) from the magazine plane into a working plane. In particular, a lifting element, such as a (pneumatic) lifting cylinder, is provided for this purpose. The respective selected holder therefore moves individually out of the magazine plane into the working plane and is gripped in this plane by the processing head. The processing head is specially designed with suitable holding and guiding elements on its underside. The cable element is therefore guided from below to the underside of the processing head and gripped there. The individual process steps carried out by the processing head then follow, in particular pulling and cutting to a specific length.

The lifting element is arranged on a carrier and moves the holder into the working plane.

The processing head itself can be designed to grip a selected holder and to lift the holder into the working plane. For this purpose, the processing head itself has the lifting element.

The processing head can have at least one gripping piece for gripping the holder and the holder has at least one driving element of complementary design. For lifting, the gripping piece and the driver element engage in each other. A positive connection between these two elements is especially provided. For example, the gripping piece or the driving element is designed as a profile element, for example as a C-profile element, and the complementarily designed counterpart (driving element/gripping piece) has a widened head which is inserted into the C-profile for the positive connection. The holder, for example, comprises two driving elements which are spaced apart from each other in the longitudinal direction, and the gripping of the individual holder is effected in particular by the fact that the processing head moves in the transverse direction and the gripping piece and the driving element automatically form the positive connection. The holder is then lifted into the working plane by the lifting element, for example a pneumatic cylinder.

When lifting into the working plane, the processing head takes over the holder together with the cable element held in it. The cable element is then picked up by guide elements arranged on the underside of the processing head.

For reliable guidance of the cable element on the processing head, it is advantageous if the respective cable element is held in the holder in a clamped state. Accordingly, the cable element is also held in such a clamped state, i.e. in tension, between the two fixing elements of the holder.

The processing head can be generally designed to process the selected cable element while it is held in the holder. The cable element therefore remains in the holder and the processing head grips the cable element that is still guided in the holder. When pulling or unwinding the cable element, the cable element is therefore still guided through the holder. Repeated threading in and out of the holder is therefore not necessary.

The processing head can have at least one pull-off unit for pulling the cable element in longitudinal direction and a cutting unit for cutting off a cable section from the selected cable element. The at least one pull-off unit first takes up the cable element, whereby the cable element can be inserted into the pull-off unit from below, for example. The pull-off unit preferably has conveying elements, such as rollers, belts, etc., which are opposite each other in the transverse direction. After the cable element has been lifted into the working plane, these are moved against the cable element by means of adjusting elements. A contact pressure of the individual conveying elements against the cable element is preferably adjustable. Due to the adjustable conveying elements relative to the position of the cable element, and especially by adjusting the contact pressure, cable elements with different diameters, different surface finishes, etc. can be reliably conveyed without any problems.

Two pull-off units can be provided, which are spaced apart from each other in the longitudinal direction. The two pull-off units can differ with regard to their drive power and conveying force which is transmitted to the respective cable element. In particular, the rear pull-off unit exerts a greater conveying force than the front pull-off unit. The rear pull-off unit, for example, is equipped with a more powerful feed motor.

The processing head also can have a measuring element for measuring a pull-off length of the cable element. The measuring element is located in particular between the two pull-off units. The two pull-off units are coordinated with regard to their conveying speed in such a way that the cable element is kept in tension between them, thus enabling a reliable and accurate measurement of the length. When the desired length of the line section to be cut off is reached, a corresponding signal is sent to a control unit and the cable element is cut to the desired length.

Furthermore, the processing head can comprise an aligning unit for stretching or rolling the cable element, especially at the rear end on the unwinding side of the processing head. This aligning unit eliminates deformations caused by the holding of the cable element, for example.

In particular, opposite rollers can be provided for this purpose, which, viewed in cross-section, have a V-shaped receiving area for the cable element. These V-rollers are preferably moved—similar to the conveying elements of the pull-off units—to each other in transverse direction after the selected cable element has been lifted into the working plane. They are, for example, again pushed to the cable element by an adjustable force.

For example, several, especially two, aligning units can be provided, which are arranged vertically one above the other. They differ from each other especially with regard to the design of their V-rolls, especially with regard to the width of the receiving space provided by the V-rolls for the cable element. This ensures that cable elements with different cable cross-sections can be safely and reliably accommodated. The two aligning units are preferably movable in vertical direction with suitable adjusting elements, for example (pneumatic) cylinders. The aligning units are arranged on the underside of the processing head and are therefore adjustable in the vertical direction relative to this underside.

The holder can have an especially exchangeable nozzle at its front end to accommodate a front end section of the respective cable element. The cable element is led through the nozzle. The nozzle is arranged on the holder in such a way that it can be replaced, in particular by means of a quick-release fastener, e.g. a bayonet lock or any other exchangeable fastening option. The diameter of the nozzle is preferably adapted to the diameter of the respective cable element, so that the cable element is reliably guided concentrically through the nozzle. For different cable elements with different diameters, different nozzles with different nozzle cross-sections are preferably provided. In particular, the nozzle is located at the front end of the holder and thus defines a cable exit for the cable element from the holder.

The nozzle can have a window, i.e. a side opening, for printing the cable element. Specifically, the window provides a print pattern, such as a label, so that this print pattern can be used, for example, to uniquely identify the respective type of cable element used. Alternatively, the desired print pattern is achieved by means of a suitable control of a print head.

The processing head can have a receptacle corresponding to the nozzle, the receptacle being designed in particular for centring the nozzle and preferably having at least one centring element for this purpose. By means of this measure, the nozzle and thus the cable element held therein is oriented in a defined manner in relation to the processing head and especially in relation to the cutting unit attached to the processing head at a front end. The cutting unit is—when the holder/cable element is gripped by the processing head—arranged in the longitudinal direction, in particular immediately following the nozzle. Therefore, the cable element is cut off directly at the outlet of the nozzle. The centring element is, for example, an adjusting/pneumatic cylinder. Preferably two such centring elements are provided, which are arranged opposite each other (viewed in transverse direction).

Furthermore, the processing head can have at least one print head for printing the respective cable element. This print head is positioned or can be positioned in particular at the nozzle receptacle. Preferably two print heads are designed, which are preferably arranged opposite each other in transverse direction. For example, the two print heads are used to provide different colours. In general, the nozzle ensures, in particular through its centering, that the cable element is guided in an exact position during printing, so that printing, for example using an ink jet, always hits a center of the cable element. The nozzle is preferably specially designed, especially asymmetrically, so that only one of the two print heads can be moved to the window position. The choice of nozzle therefore determines which of the two print heads and thus, for example, which colour is used. Depending on the selected nozzle and its asymmetrical shape, the approach of one of the two print heads to the print window is therefore prevented.

As already mentioned above, the cutting unit can be arranged in a preferred embodiment in longitudinal direction following the nozzle. Furthermore, the pull-off unit, in particular the second, front pull-off unit, is arranged in the longitudinal direction preferably directly in front of the nozzle or in front of the mounting for the nozzle. This ensures that the distance to the cutting unit after the front pull-off unit is as short as possible.

The cutting station also can comprise a gripper unit for the cable element, which is arranged in longitudinal direction following the processing head. The gripping element serves to grip a front end of the selected cable element and to transfer a line section provided by the processing head to at least one gripper, in particular transport gripper. The gripping unit is designed in particular in such a way that the front end of the line section which protrudes from the processing head is gripped and then fed to the transport gripper and transferred to it. The transport gripper is in particular a clamping gripper which clamps the front end of the cable section. The gripping of the front end by the gripping unit and the transfer to the transport gripper is typically carried out during the pulling off of the cable element in longitudinal direction by means of the pulling units of the processing head. This means that the gripping unit or the transport gripper holds the front end of the selected cable element when it is pulled off the reel and later cut off by the cutting unit. The gripper unit is preferably arranged so that it is adjustable, so that it can move the front end of the cable element to the transport gripper.

The gripper unit can be pivoted around a pivot axis and two transport grippers are provided to pick up two ends of the cable section cut from the processing head. During operation, the gripper unit is pivoted in such a way that the cable section is held by the transport grippers, forming a loop. By gripping the front end of the cable element and rotating it, especially by 180°, the front end is therefore also transferred offset to the first transport gripper in the transverse direction. The second transport gripper is preferably placed in front of the cable outlet, i.e. in front of the nozzle of the holder or in front of the cutting unit, so that the rear, cut-off end of the cable element is picked up by the second transport gripper. The continuous pulling and conveying to the desired cable length automatically forms a hanging loop.

Furthermore, the cutting station can have a transport system which—viewed in the longitudinal direction—runs in front of the processing head and thus also in front of the magazine in the transverse direction and is designed in particular to receive and further transport a cut-to-length line section. The two transport grippers are preferably part of the transport system and are moved in transverse direction during operation. Typically, a large number of transport grippers are provided for this purpose, i.e. they pick up successively cut-to-length cable sections and transport them, for example, to a subsequent processing station.

The cutting station also can comprise an untwisting unit in an exemplary embodiment, which is designed to untwist the cut-to-length cable element. By unwinding the cable element from a reel, a twist is typically formed in the cable element itself, which leads to a twisting of the cable element around its central axis. For untwisting, the untwisting unit preferably has a fixed gripper as well as a rotary gripper that can be rotated about a rotation axis. The two grippers each pick up one end of the cut-to-length cable element. During operation, the rotary gripper with the cable element rotates around the axis of rotation so that one end opposite the other end is undrilled again. The rotary gripper is rotated by a predetermined angle of rotation. This angle of rotation is calculated individually and depends on the length of the disconnected cable element as well as on the current state of the reel from which the cable element is unwound.

The object of the invention is achieved by method for automatically cutting cable elements to a specific length with the aid of the cutting station described here with the following steps: arrangement of cable elements each in a holder, the holders extending in a longitudinal direction and being arranged in a magazine side by side in a transverse direction; selection and processing of a special cable element from the magazine with the aid of a processing head, wherein the processing head moves in the transverse direction relative to the magazine, grips, pulls off and cuts to length the selected line element, whereby each holder holds the respective cable element with the aid of at least two fixing elements.

The advantages and preferred embodiments described with regard to the cutting station are to be applied analogously to the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE FIGURES

The present invention will become more fully understood from the detailed description given hereinbelow and the accompanying drawings which are given by way of illustration only, and thus, are not limitive of the present invention and wherein.

DETAILED DESCRIPTION

Figure 1:
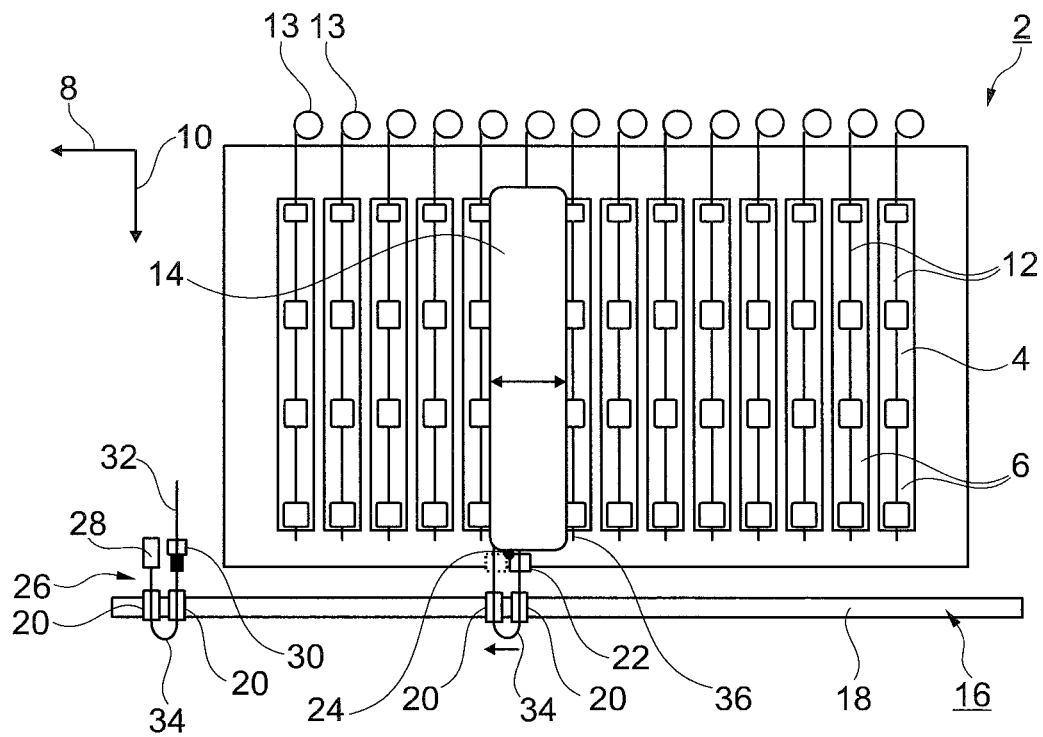
FIG. 1 illustrates of a cutting station with a magazine and a processing head arranged above the magazine as well as a transport system.

The cutting station 2 shown in FIG. 1 comprises a horizontally arranged magazine 4 with a large number of individual holders 6, the individual holders 6 being arranged next to each other in a transverse direction 8. They each extend in a longitudinal direction 10 and each take up a cable element 12, which also extends in a longitudinal direction 10. The transverse direction 8 and the longitudinal direction 10 define a horizontal plane. The cable elements 12 are each provided by reels 13, which are arranged behind the magazine 4.

Above the magazine 4 a processing head 14 is arranged, which can be moved in transverse direction 8 relative to the magazine 4. The magazine 4 as well as the processing head 14 are, for example, arranged in a supporting frame or supporting structure not shown in detail here.

Viewed in longitudinal direction 10, in front of the magazine 4 and in front of the processing head 14, a transport system 16 is also arranged, which has a conveyor 18 running in transverse direction 8. This is designed, for example, as a conveyor belt or a conveyor rail. Furthermore, the transport system 16 comprises several transport grippers 20, which can be moved along the conveying element 18.

The holders 6 are used to hold different types of cable elements 12, that means the cable elements 12 provided in magazine 4 in the holders 6 differ.

At a front end of the processing head 14, viewed in longitudinal direction 10, i.e. at its front end face, a gripper unit 22 is arranged, which can be pivoted around a pivot axis 24, in particular by 180°. The pivoted position of the gripper unit 22 is shown as a dotted line in FIG. 1.

Furthermore, the Cutting station 2 has an untwisting unit 26, which is arranged, for example, in the transverse direction at the edge of the magazine 4. The untwisting 26 has a fixed gripper 28 and a rotary gripper 30. This can be rotated about a rotation axis 32.

The basic operation of cutting station 2 is as follows:

In a first step, the processing head 14 moves in transverse direction 8 to the respective holder 6, which has the currently selected type of cable element 12. In the next step, the holder 6 together with the cable element 12 held therein is lifted from a magazine plane M into a working plane B (see FIG. 2). In doing so, the cable element 12, which is still held in the holder 6, is picked up by functional and processing units arranged on the underside of the processing head 14 (cf. in detail FIG. 5 with corresponding description). By means of the processing head 14 the respective cable element 12 is gripped, unwound in longitudinal direction 10 from the assigned reel 13 and cut off to a predetermined length so that a cut-to-length line section 34 is provided.

During this process, a front end 36 of the selected cable element 12 is gripped by the gripper unit 22. During the pull-off of the cable element 12, the gripper unit 22 swivels around the pivot axis 24 by 180° and transfers the front end 36 to a first transport gripper 20. By means of the processing head 14, the cable element 12 is continuously fed in longitudinal direction 10 until the desired length is reached. A rear end or a rear end section of the line section 34 to be cut off is then gripped by the second transport gripper 20, before the line section 34 is then cut off from the remaining cable element 12, so that the cut line section 34 is obtained.

The cut-to-length line section 34 held in the two transport grippers 20 is then transported further by means of transport system 16. Preferably first to the untwisting unit 26, in which the two ends of the cut cable section 34 are gripped by the fixed gripper 28 and the rotary gripper 30. With the help of a relative rotation by means of the rotary gripper 30 around the central longitudinal axis of the cut to length cable section 34, an especially software-controlled untwisting takes place.

After cutting to a specific length, the processing head 14 starts a new cutting cycle. If a further line section 34 of the cable element 12 currently in the processing head 14 is required, the currently held cable element 12 is cut to the specific length again.

If a different type of cable element 12 is required, the processing head 14 first sets the selected holder 6 back into magazine plane M, moves to the next selected type of cable element 12, lifts its holder 6 into working plane B and restarts the cutting process as described above.

Figure 2:
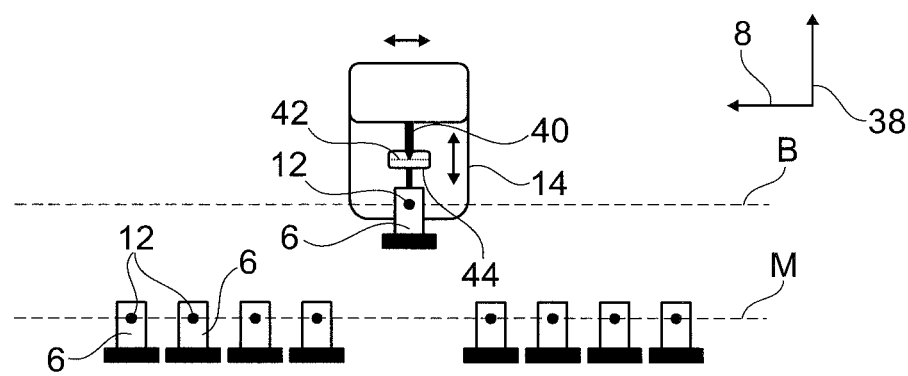
FIG. 2 shows a sectional view of a front of the magazine with the processing head.

Lifting from the magazine plane M into the working plane B is illustrated in more detail in FIG. 2: First of all, it can be seen from this that the individual holders 6 are arranged next to each other and each guide a cable element 12. For this purpose, each holder has several guide elements, for example vertically protruding webs each with a feed-through, which is designed in the manner of a simple hole or an eyelet, for example, and through which the respective cable element 12 is threaded. The individual guide elements 12 are located within a common horizontal plane, which is referred to as the magazine plane M in this case.

From this, the holders 6 are lifted in a vertical direction 38 so that the selected holder is lifted into a working plane B formed above the magazine plane M. A lifting element 40, specially designed as a pneumatic lifting cylinder, is arranged on the underside of the processing head 14 for lifting. This has a gripping piece 42 at the end, which, for example, is only designed as a widened head (mushroom head).

Corresponding to this, at least one driving element 44 is provided at holder 6, which for example forms a C-shaped profile. A positive connection is formed between gripper 42 and driver element 44, for example, by sliding one into the other and then lifting the holder 6. After the cut-to-length cycle has been completed, holder 6 is then placed back into the magazine plane M.

Figure 3:
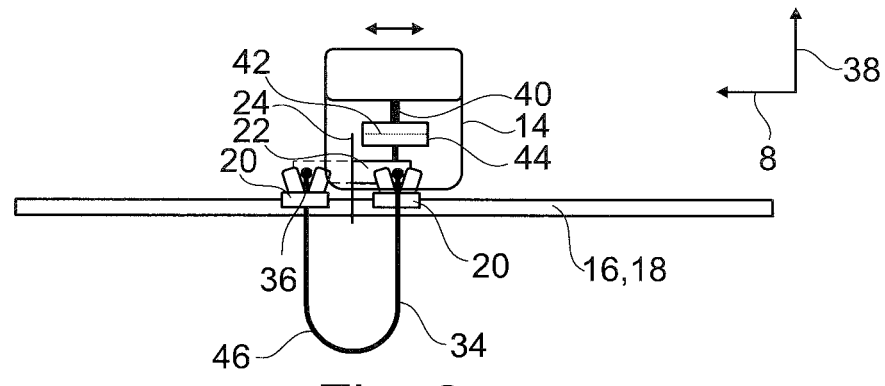
FIG. 3 shows a front view of the transport system with the processing head.

On the basis of FIG. 3, which shows a front view of the transport system 16 with the processing head 14 behind it, the transfer of the line section 34 to the two transport grippers 20 is explained. Again, the gripper unit 22, which can be swivelled about the pivot axis 24, can be seen, which grips the front end 36 and transfers it to the first, left hand transport gripper 20 by swivelling it by 180°. By successively conveying and removing the cable element 12, a loop 46 is formed which hangs downwards against the vertical direction 38. The second, rear end of the line section 34 is gripped by the second transport gripper 20 shown on the right. Afterwards, the cut-to-length line section 34, held by the transport grippers 20, is transported further.

Figure 4:
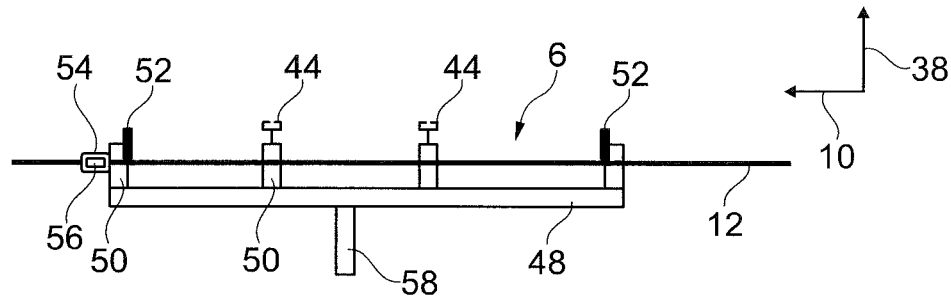
FIG. 4 shows a side view of a holder.

The structure of each holder 6 is shown in FIG. 4. This has a base body 48, for example a base plate. Several guiding webs 50, in the exemplary embodiment four, are arranged on this base plate projecting in vertical direction 38, through which the respective cable element 12 is threaded. The holder 6 also has a fixing element 52 at its rear and front end, by means of which the guide element 12 is clamped inside the holder and held in tension. Clamping is achieved, for example, by vertically shifting the fixing elements 52 relative to a clamping seat.

As can be further seen from FIG. 4, the two centrally arranged guiding webs 50 each have the driver elements 44, which are designed in the manner of C-profiles and via which the holder 6 is raised.

Following the front guiding web 50 is additionally a nozzle 54, which has a window 56, through which the cable element 12 can be printed. The nozzle 54 is interchangeably attached to the holder 6, especially to the foremost guiding web 50. A bayonet lock is provided for this purpose.

Furthermore, in the exemplary embodiment, holder 6 still has a foot 58 with which it is arranged in magazine M.

Figure 5:
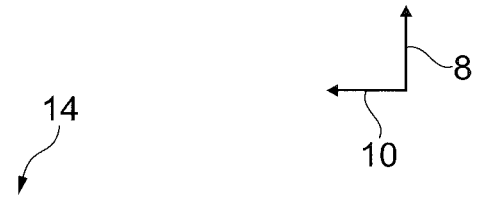
FIG. 5 shows a view of the underside of the processing head with different functional assemblies.
Figure 5:
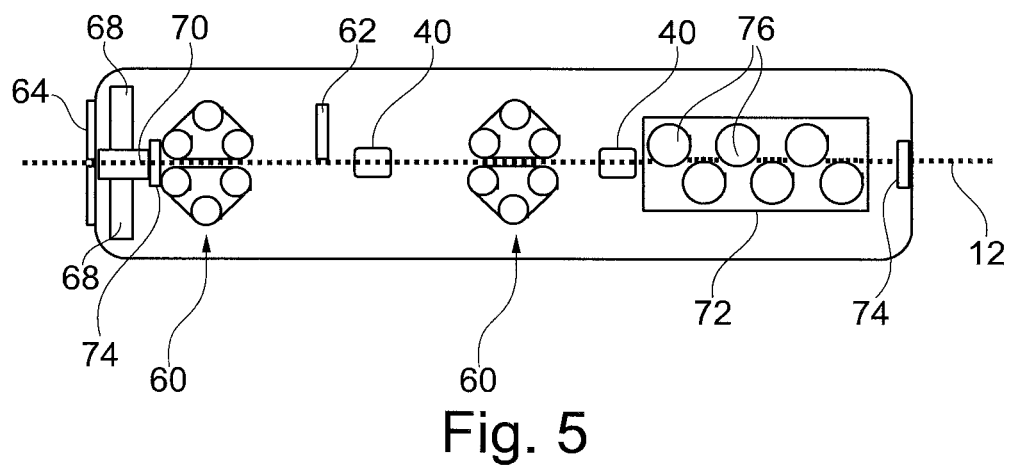

The structure of the individual functional and processing units of the processing head 14 is explained in the following on the basis of FIG. 5. This shows a top view from below of a lower side of the processing head 14. The processing head 14 has two pull-off units 60, a measuring element 62, a cutting unit 64 as well as at least one, preferably two lifting element(s) 40 as the main functional and processing units. In addition, at least one and preferably two print heads 68 and a receptacle 70 for the nozzle 54 are arranged in appropriate further embodiments. In addition, preferably an aligning unit 72 is arranged and finally, preferably two unlocking elements 74 are also arranged, which are designed to unlock the fixing element 52 of the holder 6 and thus to release the respective cable element 12. In FIG. 5 the course of the cable element 12 is shown by a dotted line.

As described above, the holder 6 together with the cable element 12 held in it is moved to the bottom of the processing head 14. In doing so, the cable element 12 is picked up by the individual functional units. In particular, the cable element is inserted between the two pull-off units 60 in a central area of the aligning unit 72 and the nozzle 54 is accommodated in the receptacle 70. Afterwards, the cable element 12 is gripped by the pull-off units 60 and the aligning unit 72, especially before the fixing elements 52 are released via the unlocking elements 54. The pretensioned condition of the cable element 12 is therefore maintained.

After the holder 6 and the cable element 12 have been lifted into the working plane B, the nozzle 54 is first fixed in the receptacle 70 by means of centering elements not shown here in detail. Then the two pull-off units 60 as well as the aligning unit 72 and also the print heads 68 are moved to each other and enclose the cable element 12. The cable element 12 is preferably first conveyed a short distance in the longitudinal direction 10 so that the front end 36 can be gripped by the gripping unit 22. At the same time the measuring of the pulled-off length begins. While the gripper unit 22 is swivelled, the conveying of the cable element 12 by the pull-off units 60 is continued continuously until the desired length is reached. When the desired length is reached the gripper unit 22 has reached its end point after 180° and has already stopped or transferred the front end 36 to the transport gripper 20.

The pull-off units 60 are each designed in two parts, whereby the two parts are arranged opposite each other in transverse direction 8 and can be moved towards each other. The pull-off units 60 each have conveying elements for pulling the cable element 12 from the respective reel 13. The respective conveying elements of the pull-off units 60 can be moved towards each other by means of adjusting elements. Preferably the contact pressure can be adjusted in relation to the cable element 12.

The aligning unit 72 has several rollers 76, which are designed as so-called V-rolls, and which are arranged alternately opposite to the guide element 12 and can again be displaced in transverse direction by means not shown here in detail. Here, too, the contact pressure is preferably adjustable by means of a drive.

Preferably, two aligning units 72 not shown in detail here are arranged one above the other in the vertical direction and can be moved into the working plane B by means of adjustment elements. The two aligning units 72 differ with regard to their V-rollers 76 and serve to accommodate cable elements 12 with different cable cross-sections.

After gripping the cable element 12 and releasing the fixing elements 52, the cable element 12 is conveyed in longitudinal direction 10 by means of the pull-off units 60 and held in tension. The measuring element 62 is arranged between the two pull-off units 60 and measures the distance of the cable element 12 pulled off the reel.

The print heads 68 are used to print and mark the respective cable element 12, either continuously or only in the end sections of the then cut-to-length line section 34.

When the desired length is reached, the pull-off units 60 stop and the cutting unit 64 cuts off the cable element 12 so that the cut to length line section 34 is obtained.

The unlocking elements 74 are designed in particular in the form of a lever which can be activated, for example by a pneumatic cylinder. The fixing elements 52 are designed, for example, as a cable holder with spring clamping, whereby the spring clamping is released by means of the lever of the unlocking element 74 in order to release the cable element 12.

The feed movement of the two conveyor elements (discharge belts) of the discharge units is preferably force-controlled. In particular, a proportional valve of the adjustment element designed as a pneumatic cylinder is provided for this purpose. In this way, a suitable pressure force is individually specified and determined for each cable element 12 in order to avoid slippage or crushing of the cable element. Between the two pull-off units 60, the cable element 12 is held in tension or at least in a tensioned state to ensure reliable measurement. The conveying elements of the two pull-off units 60 are driven by means of suitable drive units, in particular conveyor motors. The two conveying units are coupled with each other, especially by a software based control, and communicate with each other to ensure optimum conveying with as little force as possible. The drive unit of the front pull-off unit 60 is preferably designed weaker than a drive unit of the rear pull-off unit 60.

Within the receptacle 70, the nozzle 54 is precisely positioned by means of centering elements not shown in detail here, e.g. (pneumatic) cylinders, in particular by form locking, and is also held during the process in order to ensure a smooth and stable discharge of the cable element from the nozzle 54.

The two print heads 68 are preferably mechanically connected to the pull-off unit 60 and are passively placed on the nozzle 54 by this pull-off unit 60. The nozzle 54 is specially designed so that only one of the two print heads 68 can be active. Depending on the nozzle position, one of the two print heads 68 is therefore selected, for example to select different colors. The print heads 68 are especially spring-mounted for this purpose, whereby the print head 68 is activated or not depending on its position. For this purpose, a corresponding sensor, especially a proximity switch, is provided, which therefore detects whether the respective print head 68 is active or not. The respective active print head 68 then prints through the window 56 onto the cable element 12, which in particular (continuously) passes by, i.e. while it is being conveyed in the longitudinal direction 10.

The cutting unit 64 itself preferably has two opposite knives for cutting, which move towards each other in a controlled manner, for example again by means of a pneumatic cylinder.

A suitable drive, for example an electric servo drive, is provided for moving the processing head 14 in transverse direction.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cutting station for automatic cutting of cable elements to a specific length, the cutting station comprising:
    a magazine which extends in a longitudinal direction and a transverse direction and has a plurality of holders and each holder of the plurality of holders is formed for holding one of the cable elements, wherein the cable elements are held side by side in a magazine plane by the plurality of holders, each holder extending in the longitudinal direction; and
    a processing head extending in the longitudinal direction, the processing head is adapted to be moved in the transverse direction relative to the magazine and is designed for processing, namely for gripping, pulling off and cutting to a specific length a selected cable element, the selected cable element being one of the cable elements from the magazine, wherein each holder from the plurality of holders has two fixing elements spaced apart from one another in the longitudinal direction for holding the cable element, and wherein the cutting station includes at least one lifting element for lifting a selected holder perpendicularly to the longitudinal direction from the magazine plane into a working plane.

2. The cutting station according to claim 1, wherein the processing head includes the at least one lifting element configured to grip the selected holder and to lift the selected holder into the working plane.

3. The cutting station according to claim 2, wherein the processing head for gripping one holder of the plurality of holders has at least one gripping piece and the holder has at least one driver element, wherein the gripping piece and the driver element engage each other for lifting the selected holder.

4. The cutting station according to claim 1, wherein the processing head is designed to process the selected cable element while it is held in one holder of the plurality of holders.

5. The cutting station according to claim 1, wherein the processing head comprises at least one pull-off unit for pulling the selected cable element in the longitudinal direction and a cutting unit for cutting off the cable element.

6. The cutting station according to claim 1, wherein two pull-off units and a measuring element for measuring a taken-off length of the selected cable element are provided, the measuring element being arranged between the two pull-off units.

7. The cutting station according to claim 1, wherein each holder of the plurality of holders has at a front end of the holder a nozzle for receiving a front end portion of the selected cable element.

8. The cutting station according to claim 7, wherein the processing head has a print head and wherein the nozzle has a window providing a printing pattern for printing on the selected cable element.

9. The cutting station according to claim 1, wherein the processing head has a receptacle for a nozzle arranged on each holder of the plurality of holders, through which the selected cable element is guided.

10. The cutting station according to claim 9, wherein the processing head has at least one print head for printing on the respective cable element, which is positioned or can be positioned at the receptacle.

11. The cutting station according to claim 9, wherein a cutting unit is arranged in the longitudinal direction downstream of the nozzle.

12. The cutting station according to claim 1, wherein the receptacle comprises at least one centering element.

13. The cutting station according to claim 1, wherein a gripping unit for the selected cable element is arranged in the longitudinal direction downstream of the processing head, wherein the gripping unit is designed to grip a front end of the selected cable element and to transfer a line section of the selected cable element to at least one transport gripper.

14. The cutting station according to claim 13, wherein the gripper unit is pivotable about a pivot axis and two transport grippers are provided for receiving two ends of the line section and the gripper unit is pivoted during operation in such a way that the line section of the selected cable element is held by the transport grippers, thereby forming a loop.

15. The cutting station according to claim 1 further comprising a transport system, which extends in front of the processing head in transverse direction and is designed to receive and to transport a cut-to-length line section.

16. The cutting station according to claim 14, wherein the two transport grippers are part of the transport system and are moved in transverse direction during operation.

17. The cutting station according to claim 1, wherein an untwisting unit is provided which has a fixed gripper and a rotary gripper rotatable about an axis of rotation, wherein in operation the rotary gripper is configured to rotate one of the two ends of a cut-to-length line section by a predetermined angle of rotation.

18. A method for automatically cutting a cable element to a specific length with the aid of a cutting station according claim 1, the method comprising:

arranging a plurality of cable elements in a plurality of holders, the plurality of holders extending in a longitudinal direction and being arranged in a magazine plane side by side in a transverse direction; and selecting and processing of a selected cable element from the plurality of cable elements from the magazine with the aid of a processing head, wherein the processing head moves in the transverse direction relative to the magazine, grips, pulls off and cuts to length the selected cable element, and wherein each holder of the plurality of holders holds one cable element of the plurality of cable elements with the aid of at least two fixing elements.

* * * * *